(12) United States Patent
Liukkonen et al.

(10) Patent No.: US 8,873,539 B2
(45) Date of Patent: Oct. 28, 2014

(54) MULTIMEDIA CALL CONTROL MECHANISM AND COMMUNICATION EQUIPMENT USING THE SAME

(75) Inventors: Jari M. Liukkonen, Tampere (FI); Pasi Rantanen, Nokia (FI); Juha T. Rinne, Tampere (FI); Vesa Lunden, Lempäälä (FI); Yulian Wang, Tampere (FI)

(73) Assignee: Nokia Corporation, Espoo (FI)

( * ) Notice: Subject to any disclaimer, the term of this patent is extended or adjusted under 35 U.S.C. 154(b) by 1493 days.

(21) Appl. No.: 11/295,526

(22) Filed: Dec. 7, 2005

(65) Prior Publication Data

US 2007/0053344 A1 Mar. 8, 2007

(30) Foreign Application Priority Data

Sep. 6, 2005 (EP) .................................... 05019342

(51) Int. Cl.
*H04L 12/66* (2006.01)
*G08C 15/00* (2006.01)
(52) U.S. Cl.
USPC .......................................... 370/352; 370/238
(58) Field of Classification Search
USPC ........................... 370/352, 238, 310, 410, 522
See application file for complete search history.

(56) References Cited

U.S. PATENT DOCUMENTS

| 7,139,279 | B2 * | 11/2006 | Jabri et al. | 370/410 |
|---|---|---|---|---|
| 7,839,804 | B2 * | 11/2010 | Abrol et al. | 370/261 |
| 2004/0174817 | A1 * | 9/2004 | Jabri et al. | 370/238 |
| 2006/0029041 | A1 * | 2/2006 | Jabri et al. | 370/352 |
| 2006/0159037 | A1 * | 7/2006 | Jabri et al. | 370/310 |
| 2007/0058794 | A1 * | 3/2007 | Abrol et al. | 379/202.01 |
| 2007/0060163 | A1 * | 3/2007 | Jabri et al. | 455/450 |
| 2010/0277562 | A1 * | 11/2010 | Jabri et al. | 348/14.01 |

FOREIGN PATENT DOCUMENTS

| CN | 1425238 A | 6/2003 |
|---|---|---|
| WO | WO 01/39447 A1 | 5/2001 |
| WO | WO 02/52825 A1 | 7/2002 |
| WO | WO 2006/020031 A2 | 2/2006 |
| WO | WO 2006/066246 A2 | 6/2006 |

OTHER PUBLICATIONS

Jabri et al., Proposal of Bearer-based Fast Session Setup Procedure to H.324, Apr. 5, 2005, Dilithium Networks, ITU-T, Q1-D16, Q.1/16, wftp3.itu.int/av-arch/lbc-site/2005-2008/0505_Biel/.*
Study Group 16, Part II.B (Implementor's Guides) of the Report of WP 2/16 (Services and High Rate Systems), COM 16-R-54-E, Jul. 1999.*

(Continued)

*Primary Examiner* — Nicholas Jensen
(74) *Attorney, Agent, or Firm* — Alston & Bird LLP

(57) ABSTRACT

A method of controlling an establishment of a multimedia call between at least two communication equipments, a corresponding system, and a corresponding communication equipment comprise a set up of a bearer connection resulting in a creation of a data transmission channel between at least two communication equipments.

A data stream is transmitted between the at least two communication equipments after the creation of the data transmission channel for maintaining synchronization of the data transmission channel. Predefined information elements are introduced in the data stream, wherein the predefined information elements indicate local protocol settings for the multimedia call. The predefined information elements are recognized from the data stream, and parameters of an application protocol used for the multimedia call are adjusted on the basis of the predefined information elements.

61 Claims, 5 Drawing Sheets

(56) References Cited

OTHER PUBLICATIONS

Fast Session Setup Extensions to 1-1.324; D 32, ITU-T Draft Study Period 2005-2008, Geneva; CH, vol. Study Group 16 (Nov. 16, 2004), 1-8 (XP017407822).*

3GPP TS 24.008 v3.16.0 (Jun. 2003) "3$^{rd}$ Generation Partnership Project; Technical Specification Group Core Network; Mobile radio interface layer 3 specification; Core Network Protocols; Stage3 (Release 1999)"; pp. 1-450.

3GPP TS 26.911 v3.4.0 (Mar. 2003) "3$^{rd}$ Generation Partnership Project; Technical Specification Group Services and System Aspects; Codec(s) for circuit switched multimedia telephony service; Terminal implementor's guide (Release 1999)"; pp. 1-12.

3 GPP TS 26.112 v.1.1.0 (Jun. 1999) "3$^{rd}$ Generation Partnership Project(3GPP); Technical Specification Group (TSG) Codec Working Group; Codec(s) for Circuit Switched Multimedia Telephony Service Call Set-up Requirements"; pp. 1-21.

ITU-T H.324 (Mar. 2002); Series H: Audiovisual and Multimedia Systems; Infrastructure of audiovisual services—Systems and terminal equipment for audiovisual services; "Terminal for low bit-rate multimedia communication"; 76 pages.

ITU-T H.223 (Jul. 2001); Series H: Audiovisual and Multimedia Systems; Infrastructure of audiovisual services—Transmission multiplexing and synchronization; "Multiplexing protocol for low bit rate multimedia communication"; 71 pages.

ITU-T H.425 (Jul. 2003); Series H: Audiovisual and Multimedia Systems; Infrastructure of audiovisual services—Communication procedures; "Control protocol for multimedia communication"; 324 pages.

Radvision: "*The Preferred Solution for Reducing 3G-324M Call Setup Time*", XP-002369804, 2005, pp. 1-20.

International Search Report PCT/IB2006/052694 filed Aug. 4, 2006.

Office Action for Chinese Application No. 200680038489.5 dated Apr. 13, 2011.

Office Action in European Application No. 06 780 317.1 dated Jun. 13, 2014.

*Fast Session Setup Extensions to H.324; D 32*, ITU-T Draft Study Period 2005-2008, Geneva; CH, vol. Study Group 16 (Nov. 16, 2004), 1-8 (XP017407822).

Office Action from Chinese Patent Application No. 200680038489.5 dated Jul. 3, 2012.

* cited by examiner

MULTIMEDIA CALL CONTROL MECHANISM AND COMMUNICATION EQUIPMENT USING THE SAME

BACKGROUND OF THE INVENTION

1. Field of the Invention

The present invention relates to a method of controlling an establishment of a multimedia call between at least two communication equipments, a corresponding system and a corresponding communication equipment. In particular, the present invention relates to method, system and communication equipment by means of which the set-up time for a video telephony call can be improved.

For the purpose of the present invention to be described herein below, it should be noted that

- a communication equipment may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;
- although reference was made herein before to video telephony, this exemplifies only a specific example of content; content as used in the present invention is intended to mean multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's communication equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another communication equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the communication equipment and another communication equipment or terminal, a database, a server, etc., one or more intermediate network elements such as control network elements, support nodes or service nodes are involved.

One application whose importance for current and future communication systems increases are multimedia communication services, and in particular conversational video telephony (VT) services. Generally, video communication is related to a communication with moving pictures, but it also to some extent concerns text and voice, especially in combination for multimedia communication or calls. A multimedia call is a communication where, for example, sound (voice), text and picture are used simultaneously. Video telephony, also called videophone, is defined as remote communication via terminals, capable of transmitting substantially in real time moving pictures and audio between a sender and a receiver reciprocally. Since such conversational VT services are delay sensitive applications, as a delay during the transmission of a VT call is incommoding and inconvenient for a user, it is required to chose adequate signalling paths and procedures for VT calls in order to ensure that the quality of such a connection is sufficient for the user. Furthermore, since VT call requires the transmission of several different types of data (video, audio, and the like) in parallel, and these data are to be transmitted and received by various different types of communication equipments or network elements, it is required that plural communication protocols are negotiated and appropriate parameters for the communication are adjusted.

For example, in 3G networks, it is mandated by the 3GPP to use a 3G bandwidth guaranteed circuit switched bearer. Furthermore, as the standard to be used for such a multimedia communication, a 3G-324M system is to be employed. The 3G-324M system represents a derivate of the ITU-T H.324 protocol which in turn requires the employment of several further components or protocols, such as the ITU-T H.223 protocol for multiplex and the ITU-T H.245 protocol for call control for multimedia communications between different multimedia systems. The general procedures for establishing a multimedia communication are known for those skilled in the art so that a detailed description thereof is omitted herein.

Generally, when a multimedia call like a VT call is to be established, for example in a 3G network using the 3G-324M system mentioned above, the following (simplified described) procedures are executed. Further details of these procedures can be found, for example, in 3GPP specifications TS 26.112 V1.1.0, TS 24.008 V3.16.0, and TR 26.911 V3.4.0.

The negotiation of parameters for the VT call is done in following phases:

A: In a first signalling phase, BCIE (Bearer Capability Information Element) and LCIE (Low layer Compatibility Information Element) parameters are exchanged. This is the normal mobile call setup procedure, as executed, for example in voice and data calls. The BCIE and LCIE parameters inform the other entity (i.e. another communication equipment) of the bearer capabilities of the peer end (i.e. the (calling) communication equipment) and is primarily used to setup the bearer link (i.e. a physical layer connection). Once the physical link is established, a bearer protocol starts sending stuffing information into the just created bit pipe. The actual video protocol data is provided to the bit pipe by a video application protocol, once it has been initialized.

B: In an application protocol negotiation phase, the application protocol is initialized and a application protocol "handshaking" procedure is started with the peer entity. This phase takes normally much longer than phase A. It is to be noted that the handshaking of application protocol parameters is not possible before the physical bit pipe has been created.

In such a conventional video call establishment, the setup time may last a comparative long time. The reason for this is, as mentioned above, that such a video call setup requires several level of protocol negotiation in order to exchange and agree the video application parameters between peer entity (i.e. communication equipments participating in the video call). However, long waiting times before the video call can actually be started are undesired and lower the attractiveness of video telephony services for the users.

Presently, there are proposed various proprietary solutions to speed up the video call setup. However, those solutions are related to speed up video protocol negotiation. For example, vendor ID information are used to select parameters for the logical channel to be proposed.

SUMMARY OF THE INVENTION

Thus, it is an object of the invention to provide a mechanism for controlling the establishment of a multimedia call between at least two communication equipments by means of which the call setup time can be shortened.

This object is achieved by the measures defined in the attached claims.

In particular, according to one aspect of the proposed solution, there is provided, for example, a method of controlling an establishment of a multimedia call between at least two communication equipments, comprising the steps of setting up a bearer connection resulting in a creation of a data transmission channel between at least two communication equipments, transmitting a data stream between the at least two communication equipments after the creation of the data transmission channel for maintaining synchronization of the data transmission channel, introducing predefined information elements in the data stream, wherein the predefined information elements indicates local protocol settings for the multimedia call, receiving the data stream and recognizing the predefined information elements from the data stream, and adjusting parameters of an application protocol used for the multimedia call on the basis of the predefined information elements.

Furthermore, according to one aspect of the proposed solution, there is provided, for example, a system usable for controlling an establishment of a multimedia call between at least two communication equipments, the system comprising at least two communication equipments, and a communication network for transmitting data between the at least two network elements, wherein the system is operably connected to as well as configured to set up a bearer connection resulting in a creation of a data transmission channel between at least two communication equipments, transmit a data stream between the at least two communication equipments after the creation of the data transmission channel for maintaining synchronization of the data transmission channel, introduce predefined information elements in the data stream, wherein the predefined information elements indicates local protocol settings for the multimedia call, receive the data stream and recognize the predefined information elements from the data stream, and adjust parameters of an application protocol used for the multimedia call on the basis of the predefined information elements.

Similarly, according to one aspect of the proposed solution, there is provided, for example, a system usable for controlling an establishment of a multimedia call between at least two communication equipments, the system comprising at least two communication equipments, and a communication network for transmitting data between the at least two network elements, wherein the system further comprises processing means including a local bearer portion for setting up a bearer connection resulting in a creation of a data transmission channel between at least two communication equipments, transmission means for transmitting a data stream between the at least two communication equipments after the creation of the data transmission channel for maintaining synchronization of the data transmission channel, wherein the processing means further comprises means for introducing predefined information elements in the data stream, wherein the predefined information elements indicates local protocol settings for the multimedia call, receiving means for receiving the data stream, means for recognizing the predefined information elements from the data stream, and an application portion for adjusting parameters of an application protocol used for the multimedia call on the basis of the predefined information elements.

Moreover, according to one aspect of the proposed solution, there is provided, for example, a communication equipment usable for controlling an establishment of a multimedia call to at least one other communication equipment, the communication equipment is operably connected to as well as configured to set up a bearer connection resulting in a creation of a data transmission channel to the at least one other communication equipment, transmit and receive a data stream to/from the at least one other communication equipment after the creation of the data transmission channel for maintaining synchronization of the data transmission channel, introduce predefined information elements in the data stream transmitted to the at least one other communication equipment, wherein the predefined information elements indicates local protocol settings for the multimedia call, recognize predefined information elements from the data stream received from the at least one other communication equipment, and adjust parameters of an application protocol used for the multimedia call on the basis of the predefined information elements received.

Similarly, according to one aspect of the proposed solution, there is provided, for example, a communication equipment usable for controlling an establishment of a multimedia call to at least one other communication equipment, comprising processing means including a local bearer portion for setting up a bearer connection resulting in a creation of a data transmission channel to the at least one other communication equipment, and transmission and receiving means for transmitting and receiving a data stream to/from the at least one other communication equipment after the creation of the data transmission channel for maintaining synchronization of the data transmission channel, wherein the processing means further comprises means for introducing predefined information elements in the data stream transmitted to the at least one other communication equipment, wherein the predefined information elements indicates local protocol settings for the multimedia call, means for recognizing predefined information elements from the data stream received from the at least one other communication equipment, and an application portion for adjusting parameters of an application protocol used for the multimedia call on the basis of the predefined information elements received from the at least one other communication equipment.

Furthermore, according to one aspect of the proposed solution, there is provided, for example, a communication equipment usable for controlling an establishment of a multimedia call to at least one other communication equipment, the communication equipment is operably connected to as well as configured to set up a bearer connection resulting in a creation of a data transmission channel to the at least one other communication equipment, transmit a data stream to the at least one other communication equipment after the creation of the data transmission channel for maintaining synchronization of the data transmission channel, and introduce predefined information elements in the data stream transmitted to the at least one other communication equipment, wherein the predefined information elements indicates local protocol settings for the multimedia call.

Additionally, according to one aspect of the proposed solution, there is provided, for example, a communication equipment usable for controlling an establishment of a multimedia call to at least one other communication equipment, the communication equipment is operably connected to as well as configured to set up a bearer connection resulting in a creation of a data transmission channel to the at least one other communication equipment, receive a data stream from the at least one other communication equipment after the creation of the data transmission channel for maintaining synchronization of the data transmission channel, recognize predefined information elements from the data stream received from the at least one other communication equipment which predefined information elements indicating local protocol settings of the at least one other communication equipment for the multimedia call, and adjust parameters of an application protocol used for the multimedia call on the basis of the predefined information elements received.

Moreover, according to one aspect of the proposed solution, there is provided, for example, a processing device usable in a communication equipment for controlling an establishment of a multimedia call to at least one other communication equipment, the processing device is operably connected to as well as configured to control a set up of a bearer connection resulting in a creation of a data transmission channel to the at least one other communication equipment, control a transmission and receipt of a data stream to/from the at least one other communication equipment after the creation of the data transmission channel for maintaining synchronization of the data transmission channel, control an introduction of predefined information elements in the data stream transmitted to the at least one other communication equipment, wherein the predefined information elements indicates local protocol settings for the multimedia call, control recognizing of predefined information elements from the data stream received from the at least one other communication equipment, and control an adjustment of parameters of an application protocol used for the multimedia call on the basis of the predefined information elements received.

Furthermore, according to one aspect of the proposed solution, there is provided, for example, a computer program product for a computer, comprising software code portions for making, when said product is run on the computer, said computer to function as a communication equipment and being usable for controlling an establishment of a multimedia call to at least one other communication equipment, the computer program product is configured to set up a bearer connection resulting in a creation of a data transmission channel to the at least one other communication equipment, transmit and receive a data stream to/from the at least one other communication equipment after the creation of the data transmission channel for maintaining synchronization of the data transmission channel, introduce predefined information elements in the data stream transmitted to the at least one other communication equipment, wherein the predefined information elements indicates local protocol settings for the multimedia call, recognize predefined information elements from the data stream received from the at least one other communication equipment, and adjust parameters of an application protocol used for the multimedia call on the basis of the predefined information elements received.

In addition, according to one aspect of the proposed solution, there is provided, for example, a chipset being implementable in a communication equipment and usable for controlling an establishment of a multimedia call to at least one other communication equipment, the chipset comprises chip portions being operably connected to as well as configured to set up a bearer connection resulting in a creation of a data transmission channel to the at least one other communication equipment, control a transmission and a receipt of a data stream to/from the at least one other communication equipment after the creation of the data transmission channel for maintaining synchronization of the data transmission channel, introduce predefined information elements in the data stream transmitted to the at least one other communication equipment, wherein the predefined information elements indicates local protocol settings for the multimedia call, recognize predefined information elements from the data stream received from the at least one other communication equipment, and adjust parameters of an application protocol used for the multimedia call on the basis of the predefined information elements received.

According to further refinements, the proposed solution may comprise one or more of the following features:
- the predefined information elements recognized in the data stream may be passed to an application portion in the communication equipment for executing the adjustment of the parameters of the multimedia protocol. The passing of the predefined information elements to the application portion may be executed by means of a message interface between a local bearer portion and the application portion in the communication equipment;
- a transmission of the data stream including the predefined information elements may be repeated for a predetermined number of times;

an application protocol handshaking procedure may be initialized in parallel or after the introduction of the predefined information elements in the data stream transmitted between the communication equipments. The initialization of the application protocol handshaking procedure may be executed when the predefined information elements are not recognized in the data stream after a predetermined time is elapsed. Furthermore, when the predefined information elements are recognized in the data stream after the application protocol handshaking procedure has been initialized, the application protocol handshaking procedure may be interrupted and the predefined information elements recognized in the data stream may be used for adjusting the parameters of the application protocol;

the predefined information elements may be formatted into a format which is suitable for performing an error detection processing of the transmitted predefined information elements;

the predefined information elements may comprise information which can be used by a communication equipment on the receiving side for determining a kind of a communication equipment on the sending side;

the creation of a data transmission channel between at least two communication equipments may be a creation of a synchronous transparent bit pipe between the at least two communication equipments;

the establishment of the multimedia call may comprise an establishment of a circuit switched communication connection;

the establishment of the multimedia call may comprises an establishment of a video telephony call.

By virtue of the proposed solutions, the following advantages can be achieved:

It is possible to speed up the multimedia call setup phase by using special information elements transmitted during a conventionally idle time phase. Thus, the peer entities are able to detect parameter settings for the video application protocol parameters immediately after the bit pipe between the user terminals is created. The conventionally necessary application level negotiation phase (phase B described above) can be bypassed since it is possible to transmit the parameters before the application protocol handshaking procedure is started. Thus, the time for the VT call setup can be significantly shortened. For example, it is possible to save time in the standard end-to-end H.245 inband negotiation after the establishment of the traffic or bearer channel. In other words, according to the present invention, the handshake procedure can be done earlier in comparison to a normal H.324 case, for example, so that the call setup is sped up.

The transmission of the parameters according to the present invention by means of the data stream used for maintaining the synchronization of the bit pipe can be executed in any case. This means that the proposed mechanism is universally applicable in communication systems and there is no problem that the data are possibly not transmitted at any stage between the user terminals involved. The safety of the data transmission can be further improved by repeating the transmission of the parameter information so that information which is lost during a transmission via the transparent channel/bit pipe can be completely received in a further period. Furthermore, the data can be formatted such that that possible errors are detectable, e.g. by using redundancy data.

The proposed mechanism is also easy to implement. There are no interoperability problems to be expected, for example when one communication equipment uses the proposed scheme while another communication equipment is not prepared correspondingly. In other words, the proposed mechanism does not disturb existing implementations and works regardless of where the VT call is created. For example, in case one communication equipment receives the predefined information elements indicating the parameters for the VT call but is not able to interpret them as such, these data are interpreted as normal stuffing information or garbage. Then, the conventional application protocol handshaking procedure can be executed without disturbing the call setup in an undue manner.

The above and still further objects, features and advantages of the invention will become more apparent upon referring to the description and the accompanying drawings.

DESCRIPTION OF PREFERRED EMBODIMENTS

Figure 1:
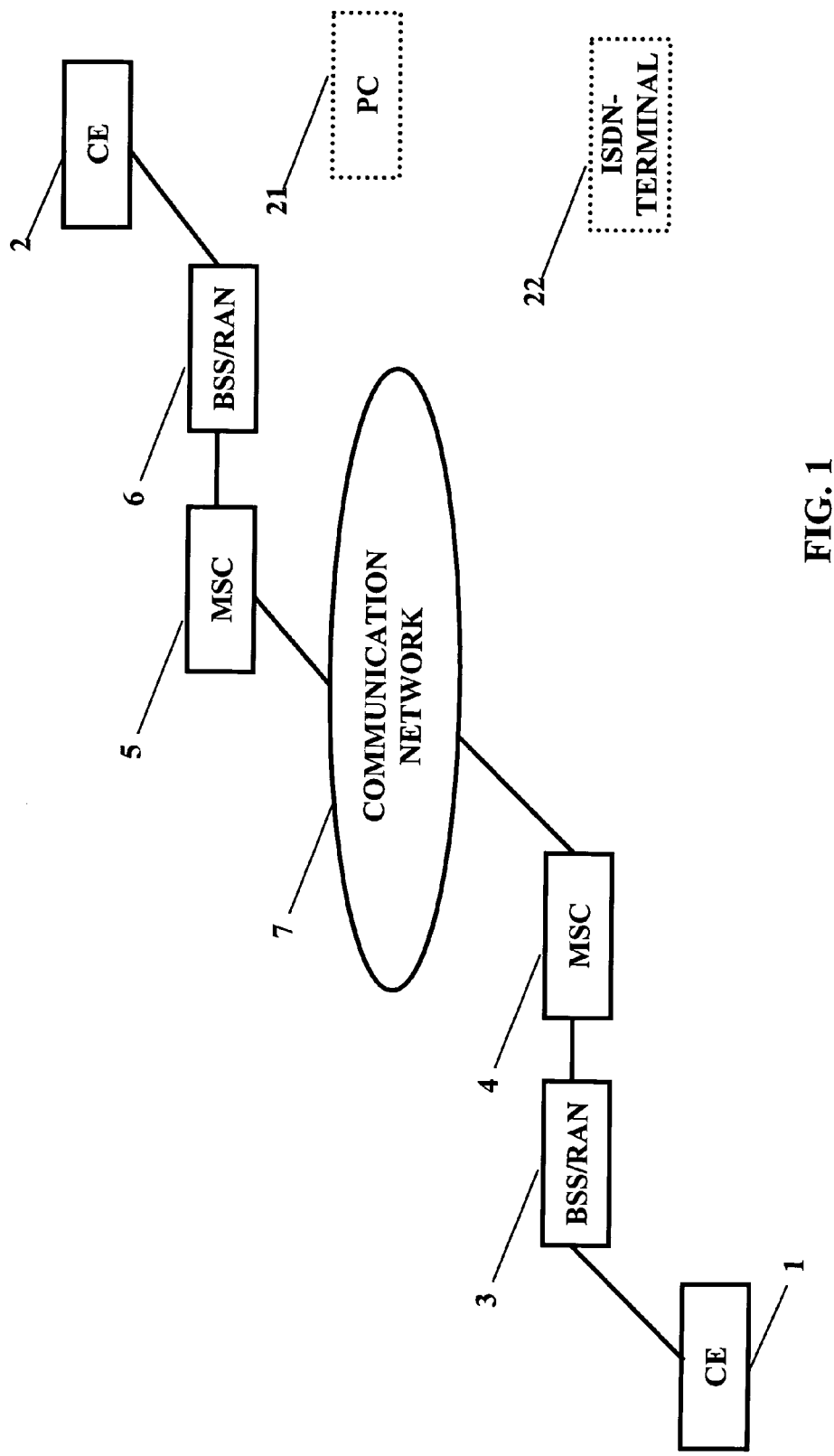
FIG. 1 shows a diagram of a simplified structure of a communication network environment where the present invention is applicable.

In the following, embodiments of the present invention are described with reference to the drawings. For illustrating the present invention, the preferred embodiments will be described in a 3G network environment comprising mobile access network subsystem and core network subsystem components according to the 3GPP specifications. However, it is to be noted that the present invention is not limited to an application in such a network environment but is also applicable in other network types. In FIG. 1, a schematic block diagram of a basic network environment of a (mobile) communication network is shown. It is to be noted that the structure according to FIG. 1 represents only a simplified example of an architecture of a communication network environment usable for the present invention. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a communication equipment UE, core network control element like a mobile switching centre MSC, an access network subsystem element like a Base Station Subsystem BSS element or Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g.

ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

According to FIG. 1, reference signs 1 and 2 denote a communication equipment, such as a mobile phone, a PDA or the like, which is able to establish a multimedia call like a VT call. It is to be noted that the communication equipment may also be a fixed terminal, such as a personal computer PC 21, an ISDN terminal 22 or the like, as long as the respective communication equipment is capable of performing VT calls. Reference signs 3 and 6 denote access network subsystems, like a BSS or a RAN, wherein the individual components thereof (base stations, base station controller and the like) are omitted in FIG. 1 for the sake of simplicity. Reference signs 4 and 5 denote a MSC as a core network control element for switching calls to be established to a defined destination. Reference sign 7 denotes a communication network used as a transition network for calls, such as a Public Switched Telephone Network PSTN, a fixed network or the like. It is to be noted that, according to the present invention, the communication network 7 may be of any type, in particular a digital network type.

Also shown in FIG. 1 there is a communication link between the CE 1 and the CE 2 which represents a multimedia call connection to be established. In this connection it is to be noted that a call connection and a corresponding control functionality of the present invention is basically not limited to a case of a connection between two individual terminals. For example, the call connection may be established between more than two communication equipments, for example in case of a multiparty implementation (multiparty may also include a case where, in a connection between two end-points, one end-point may work as a node for several calls and deliver or distribute the data between these calls). Furthermore, the communication equipments involved in the call may also reside on the same "side" of the communication network, e.g. in a same cell area controlled by the MSC 4. Then, the connection link may be directed in a different manner than shown in FIG. 1.

In the following, the call setup control mechanism for a multimedia call, in particular a video telephony call according to the present invention will be described referring to FIGS. 3 to 5 when the network environment where the invention is applied is in accordance with that shown in FIG. 1.

Figure 5:
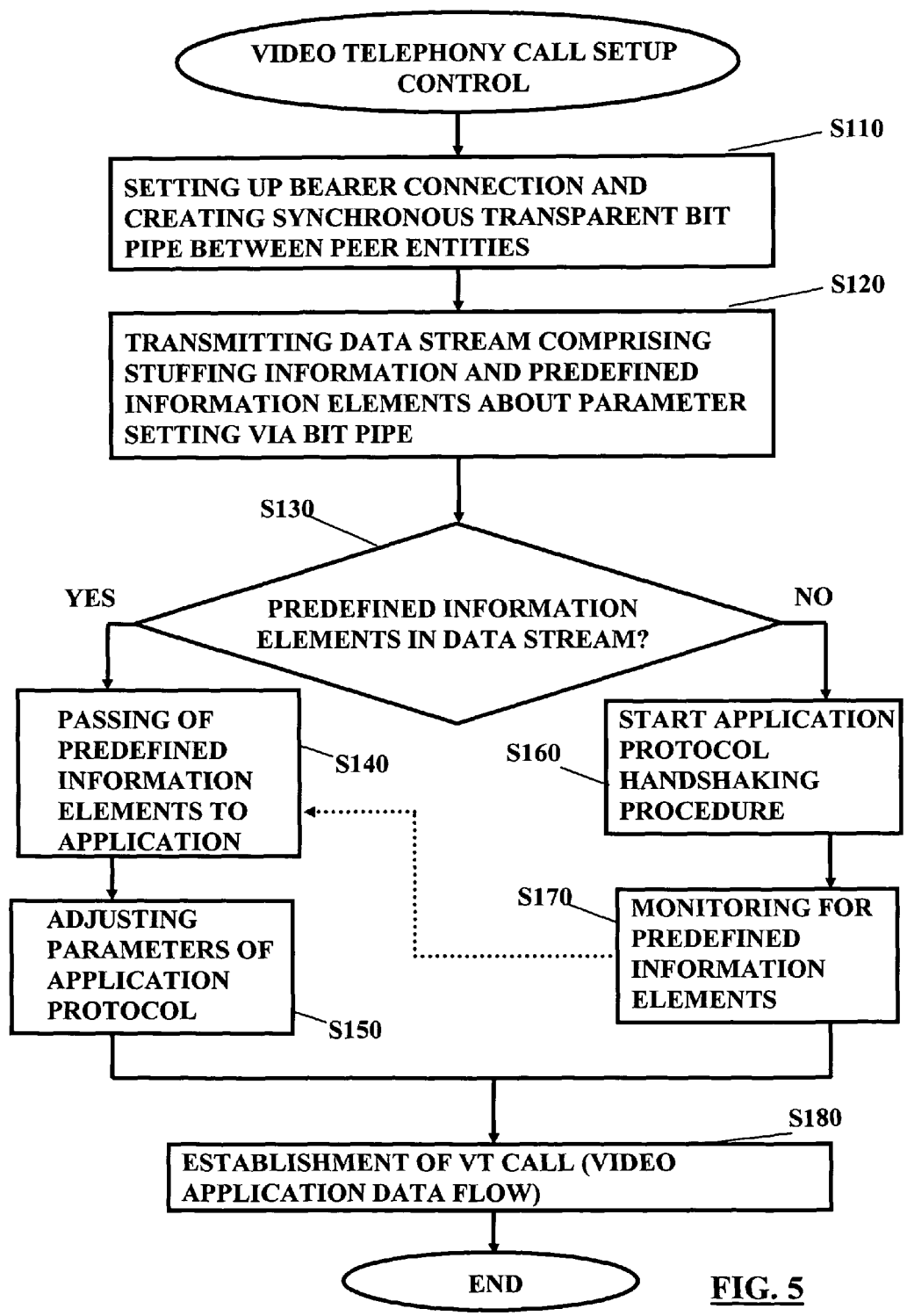
FIG. 5 shows a flow chart illustrating a call setup control procedure according to an embodiment of the present invention.

In FIG. 5, a flow chart illustrating the call setup control procedure for a multimedia call, in particular a video telephony (VT) call according to an embodiment of the present invention is shown.

When the procedure is started, in step S110, a first signaling phase between the communication equipments involved in the call is executed. For example, a normal mobile call setup procedure executed also in usual voice or data calls may be used in this phase. In case of a 3G network environment such as shown in FIG. 1, this includes, for example, a set-up of a bearer connection and a creation of a data transmission channel between the communication equipments CE 1 and 2. The establishment of the call may be based on a circuit switched communication connected via the respective BSS/RAN 3, 6, MSC 4, 5, and the communication network 7, and the data transmission channel can be, for example, a synchronous transparent bit pipe. In such a case, in the initial phase of the call setup, for setting up the bearer link (physical layer), Bearer Capability Information Elements BCIE and Low Layer Compatibility Information Elements LCIE are exchanged between the CE 1 and 2 for informing each other about the lower layer characteristics of the network and the terminals. This means that the BCIE and LCIE inform the respective other communication equipment about the bearer capabilities of the peer end. The details of this procedure for establishing a bearer connection are known for those skilled in the art so that a detailed description thereof is omitted.

Once the physical link (i.e. the bit pipe) between the CE 1 and 2 is established, a bearer protocol starts to send a data stream via the just created bit pipe. This is necessary to maintain the synchronization of the synchronous transparent data transmission channel for which a transmission of a sufficient and permanent amount of data is required.

Conventionally, the data stream for maintaining the synchronization comprises mere stuffing data, for example, data in the form of "0xFF 0xFF 0xFF 0xFF 0xFF 0xFF 0xFF 0xFF . . . ".

According to the present embodiment, predefined information elements are included in this data stream and transmitted to the respective other communication equipment (step S120). For example, instead of the stuffing data mentioned above, now data in the form of "0xFF 0xaa 0xbb 0xcc . . . 0xFF 0xFF 0xaa 0xbb 0xcc . . . 0xFF 0xFF . . . " are transmitted in the data stream after the creation of the bit pipe, where 0xaa, 0xbb 0xcc represent the predefined information elements. The predefined information elements are used for defining, for example, local protocol settings such as video application parameters. In other words, the sending communication equipment informs the other (receiving) communication equipment as a peer entity by means of the specific information elements included in the data stream about the desired application protocol features to be used, for example, for the VT call.

These settings or parameters may be preset and stored in the communication equipments for identifying a specific type of communication equipment (i.e. a kind of video terminal) and parameters thereof, i.e. the parameters to be set for a video application in case of a VT call with the respective communication equipment having the respective type of video terminal. In other words, the predefined information elements comprises data which are pre-agreed and allocated to the respective communication equipments.

The predefined information elements are introduced in the data stream, for example, from the beginning of the transmission of the data stream. Furthermore, it is preferable to repeat the transmission thereof at least a predetermined number of times so as to ensure that the receiving side (i.e. the other communication equipment as the peer end) is able to receive and recognize the information elements correctly. Additionally, the message comprising the specific information elements in the data stream between the communication equipments 1 and 2 may be formatted such that possible errors occurred, for example, during the transmission via the transparent bit pipe can be detected, e.g. by including some redundancy data.

When the communication equipment 2, 1 receives the data stream from the other communication equipment 1, 2, it determines whether or not the data stream received via the bearer connection comprises the specific information elements (step S130). It is to be noted that both communication equipments 1, 2 send their predefined information elements to the respective other communication equipment as soon as the bit pipe is created and the data stream is to be transmitted. If the data stream comprises the specific information element, the communication equipment retrieves the information elements therefrom and passes the information elements from the bearer level to the application protocol, i.e. the video application protocol in the described case (step S140). It is to be noted that alternatively, instead of passing the information elements as such to the application protocol, it is also possible to determine respective values represented or contained by the information elements received and to forward the values (or information) in a suitable form different to the received information elements to the application protocol. The passing of information can be executed, for example, by means of a message interface between the local bearer and the video application entity.

When the information elements, i.e. the information about the parameter settings for the VT call, are transferred to the application protocol entity, the parameters of the application are adjusted on the basis of the information elements retrieved (step S150). This can be effected, for example, by retrieving a corresponding set of parameters from a memory or the like, which set of parameters is allocated to the predefined information element received. Alternatively, also the information elements themselves or corresponding values contained therein may be used as the parameter settings. When the local protocol settings are completed and/or acceptable, an acknowledgement may preferably be transmitted from the respective entity to the network and/or to the other entity, and vice versa, in order to acknowledge the success of the setting (not shown).

With regard to the acknowledgement procedure, it is to be noted that this may be an optional issue. On the other hand, when such an acknowledgement procedure is implemented, a more reliable signalling can be achieved.

As an example, such an acknowledgement procedure can be executed in the following way. Once the peer terminal (for example the communication equipment) detects the other end application protocol configuration and recognizes that the values are agreeable, the respective peer terminal passes a corresponding indication to the other end. The indication may be, for example, a pre-agreed string of characters like "0xFF, 0xBB, 0xBB, 0xBB, 0xBB, 0xFF". The indication (e.g. the string mentioned above) may be repeated a pre-agreed number of times. The peer end executed a similar procedure, i.e. it checks the received protocol configuration and once it recognizes that it is agreeable, the peer end replies in the same way. Thus, both ends know the coming VT call configuration.

This exchange of acknowledgement, which can be also referred to as a negotiation, is executed on a high level, since the detailed knowledge of the application protocol parameters is in the application protocol end, which is not "started up" at that time. However, normally the VT call parameters are very close to each other, so that positive results for the acknowledgement procedure are obtainable in most cases. The acknowledgement procedure can be further improved when the negotiation direction (uplink or downlink) of parameters is properly considered (which is normally done in protocol negotiation). By means of this, the respective communication equipments are able to determine if the proposed parameters are acceptable, for example by comparing them with the own configuration. It is to be noted that it is possible to add more application protocol awareness also in the cellular protocol level. This acknowledgement procedure does not impact the call setup time, since the slowest part is the start up of the application protocol stack, which means that the acknowledgement procedure can be completed in due time without extending the setup time.

As a further option, in case the parameters are not acceptable (for example, if the negotiation is only done in very high level), the respective communication equipment can be configured to pass another pre-agreed indication being different to that in case the parameters are acceptable, as described above, to the other end. This indication may have, for example, the form of a string like "0xFF 0xCC 0xCC 0xCC 0xCC 0xFF", which may be repeated a pre-agreed number of times. The communication equipment may also be configured to stop the sending of the indication (i.e. of an indication related to acceptable parameters or an indication related to non-acceptable parameters, as described above) when a reply of the respective other end is detected. In case such a reply is indicating that the parameters are not acceptable, both ends (i.e. the communication equipments) may be configured such that the suggested protocol configuration is changed, and then the procedure is started from the beginning, or that this procedure is stopped wherein the application level negotiation is executed in the normal way.

Furthermore, if neither a negative nor a positive acknowledgement is detected at one end or both ends (communication equipment), once the application level protocol is ready to start the standard negotiation, the "early" negotiation procedure may be stopped.

It is to be noted that in a conventional VT call set procedure, after the establishment of the bearer connection (see step S110), the video application protocol also starts an initializing procedure. This means that an application protocol negotiation phase is started when the application protocol is initialized by means of starting an application protocol "handshaking" procedure with the peer entity procedure, where both application protocol end informs the peer end of it capabilities wherein on the basis thereof the correct protocol settings are chosen for a video session to be established. This step takes normally much longer that the step of executing the bearer connection setup. It is to be noted that the handshaking of application protocol parameters is not possible before a physical bit pipe has been created.

According to the present embodiment, the application protocol handshaking procedure may also be started. For example, the application protocol handshaking procedure can be started after the first data stream is received and no predefined information element is recognized in the data stream (step S160). Alternatively, the start of the application protocol handshaking procedure can be postponed by a predetermined time for awaiting whether or not the predefined information elements are received. As a further option, the application protocol handshaking procedure can be started at the same time when the predefined information elements are introduced in the data stream, i.e. when the bit pipe between the CE 1, 2 is created.

After starting the application protocol handshaking procedure, as shown in step S170, the data stream is still monitored for the predefined information element. This is done for ensuring that a delayed or interfered transmission of the predefined information elements from the other communication equipment is recognized.

If the predefined information elements are received and recognized in step S170 after starting the application protocol handshaking procedure in step S160, the application protocol handshaking procedure may be interrupted and the information elements may be processed like in the case where they are received at the beginning, i.e. in step S140. This is illustrated by means of a dotted arrow from block S170 to block S140 in FIG. 5. Otherwise, if the predefined information elements are not recognized, the application protocol handshaking procedure is completed as in case of a conventional VT call setup.

When the parameter setting of the video application is completed (and the acknowledgments for the local protocol setting are exchanged, for example), the VT call connection is established and a video application data flow can be started between the CE 1, 2 (step S180). Thereafter, the call setup control procedure is ended.

Figure 3:
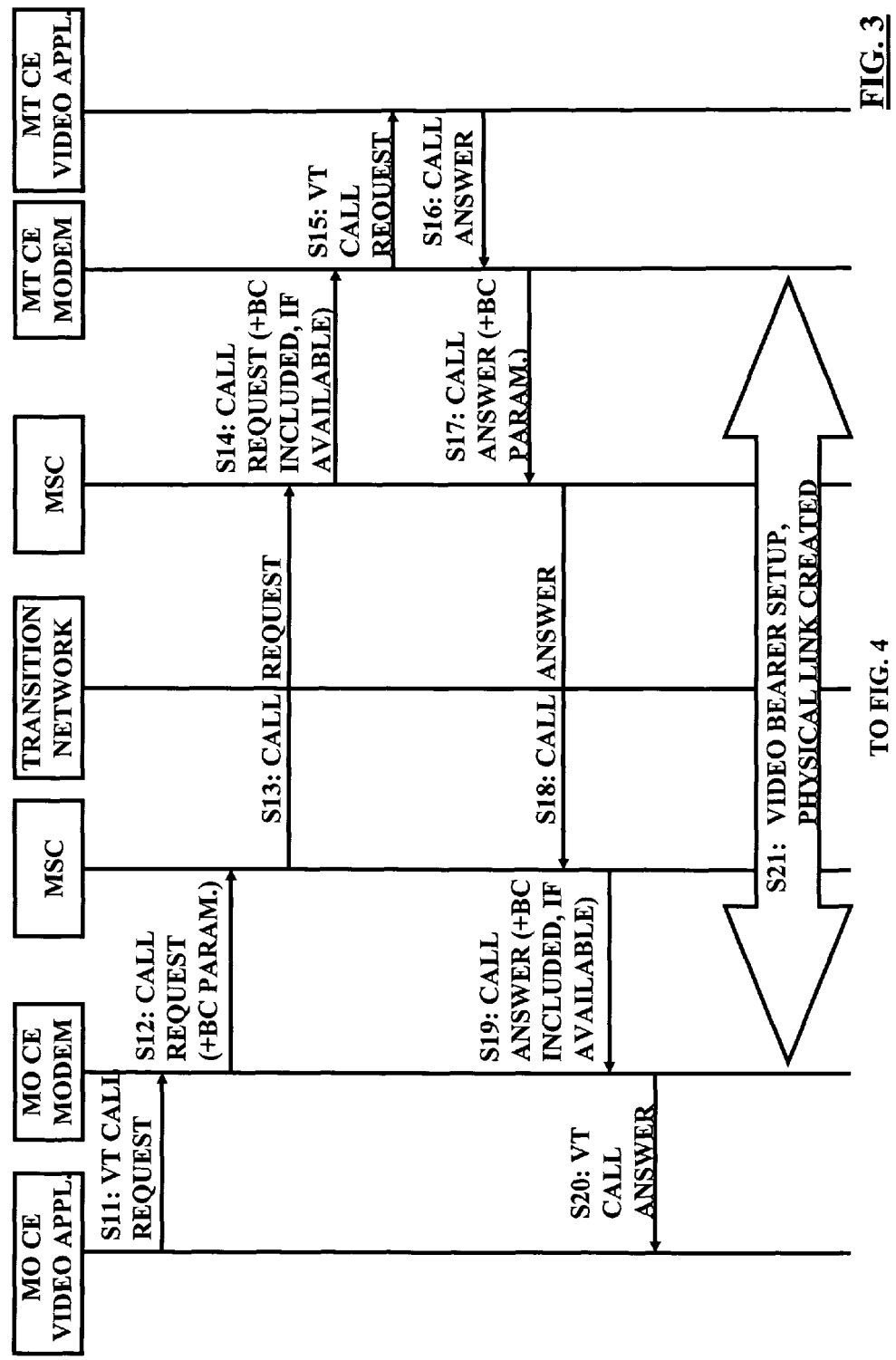
FIGS. 3 and 4 show a signaling diagram illustrating the signaling executed according to an embodiment of the present invention.
Figure 4:
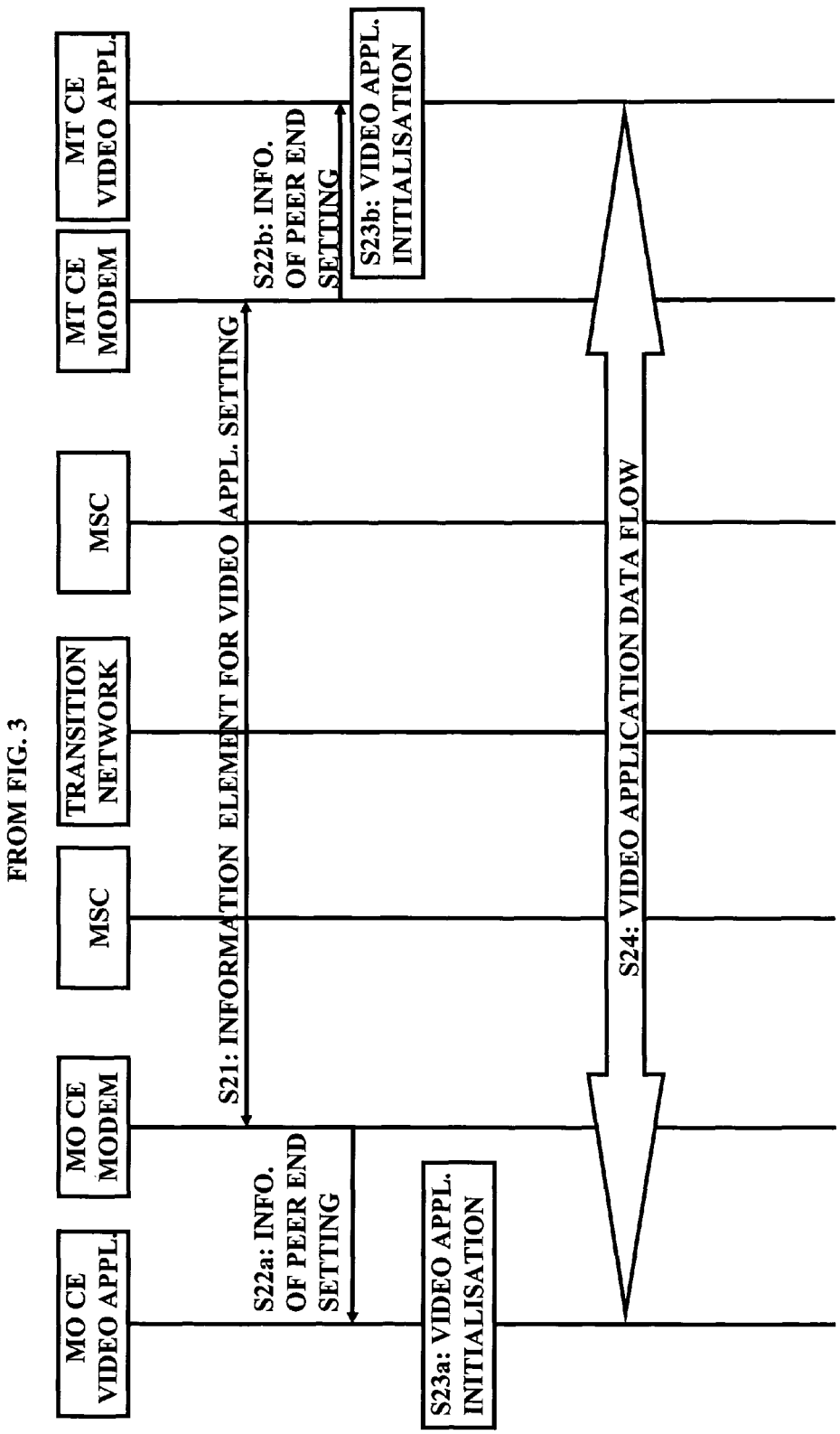

In FIGS. 3 and 4, a signaling diagram for illustrating the implementation of the procedure shown in FIG. 5 in an environment according to FIG. 1 is shown.

In step S11, when the mobile originating (MO) communication equipment (UE) video application initializes a call setup, e.g. due to a corresponding instruction from a user, a VT call request is transferred to a MO CE modem. The modem transmits in step S12 a corresponding call request to the MSC (e.g. MSC 4 via BSS/RAN 3 in FIG. 1). The modem normally includes bearer capability BC information in the call request to the MSC. The MSC forwards in S13 the call request via a transition network, e.g. the communication network 7 in FIG. 1, to a second MSC on the receiving side, for example the MSC 5. The receiving side MSC transmits the call request via the corresponding sub-networks (e.g. BSS/RAN 6) to the mobile terminating (MT) CE modem (step S14). This transmission of the call request may or may not include the BC, which is described below in greater detail. The MT CE modem in turn provides the VT call request to the MT CE video application in S15.

The MT CE video application answers the call request by a corresponding call answer in step S16 which is transferred to the MT CE modem. The MT CE modem transmits the call answer, including BC parameters similar to that in step S12, to the MSC (e.g. MSC 5) in step S17. The MSC forwards the call answer via the transition network (communication network 7) to the first MSC (MSC 4) in step S18, which first MSC transfers the call answer including the BC parameters, when available, to the MO CE modem (step S19). The MO CE modem informs the MO CE video application about the call answer in step S20. Then, as indicated with S21, a video bearer setup is completed and a physical link (e.g. a bit pipe) is created.

It is to be noted that the steps S11 to S20 correspond to step S110 in FIG. 5 and may represent a usual call setup like in a speech or data call.

In step S21 according to FIG. 4, the predefined information elements are exchanged between the communication equipments via the created bit pipe. The step S21 may thus include the measures according to step S120 in FIG. 5, i.e. the transmission of the data stream and the introduction of the predefined information elements therein.

In steps S22a, S22b, the respective MO and MT CE modems retrieve the information elements sent from the other CE modem and pass them to the MO or MT CE video application. This corresponds to steps S130 and S140 in FIG. 5. Then the corresponding CE video application can be set in accordance with the received information elements and the video application is initialized (steps S23a, S23b) (see also step S150 in FIG. 5). In addition, an acknowledgement regarding the local protocol setting can be exchanged (not shown). Thereafter, as shown in step S24, the video application data flow is executed.

Figure 2:
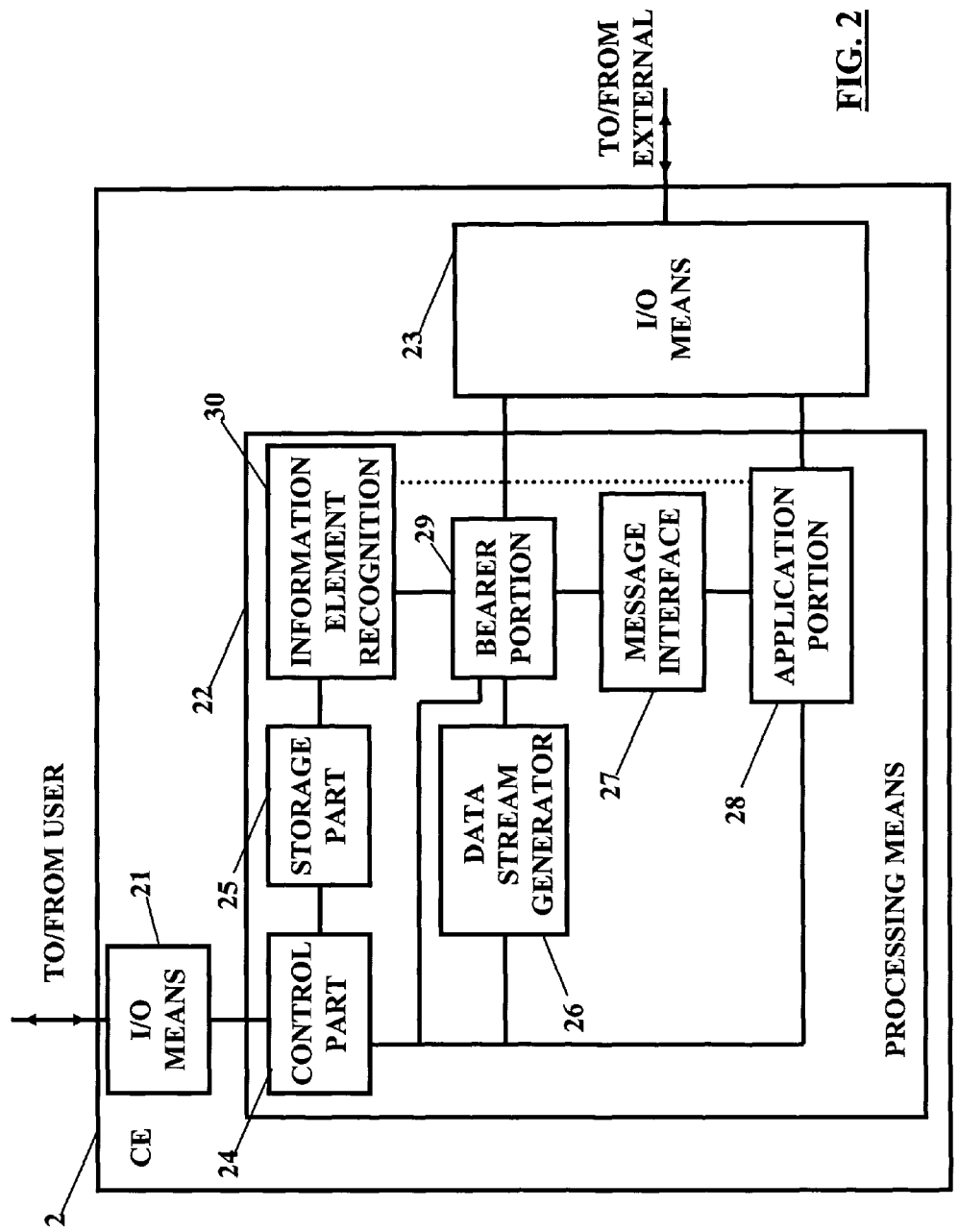
FIG. 2 shows a block circuit diagram illustrating components of a communication equipment according to an embodiment of the present invention.

In FIG. 2, a simplified structure of a communication equipment is shown which is adapted to execute the procedure described above. It is to be noted that only those elements are depicted which are necessary to understand the function of the communication equipment in connection with the present invention while those elements which are normally or optionally part of such a communication equipment and known to those skilled in the art are omitted. Furthermore, as indicated above, the functionalities provided by the elements described below can be implemented by hardware and/or software, and the elements can be included in one entity or distributed to several entities.

According to FIG. 2, the CE 2 comprises input/output (I/O) means 21 as a user interface, such as a keyboard and a display, for inputting instructions from the user and outputting information to the user. Reference sign 22 denotes a processing means which is used to implement the call setup according to the present invention. It is to be noted that the processing means 22 can be implemented, for example, as a chipset or as a part of a chipset having respective chip portions adapted to perform the corresponding processing. Reference sign 23 denotes a further I/O means for communicating with external networks, i.e. for communicating with other UE, for example, and comprises interface and/or transceiver means. Via the I/O means 23, the synchronous transparent bit pipe is established, for example.

The processing means 22 comprises a control part, such as a CPU or the like, for controlling the overall process of the processing means and the execution of the steps according to the present invention. The control part 24 is connected to the I/O means 21. Reference sign 25 denotes a storage means connected to the control means for storing processing software and data, sets of parameters for application protocol settings related to predefined information elements, a set of predefined information elements related to the present CE 2, and the like.

Reference sign 26 denotes a data stream generator for generating the data stream used for maintaining the synchronization of the bit pipe and for transmitting the predefined information elements stored in the storage means 25. The generation of the data stream and the introduction of the predefined information elements may be controlled, for example, by the control means 24. The data stream generator is connected with a bearer portion 29 which is also connected to the control means 24. The establishment of the bearer connection (i.e. the physical link) at the beginning of the VT call setup is performed by the bearer portion 29 under the control of the control part 24.

When the bearer connection is established, as described above, the predefined information elements are transmitted to the other CE via the I/O means 23, while on the other side corresponding predefined information elements are received at the bearer portion via the I/O means from the other UE. For this purpose, the bearer portion is also connected with an information element recognition part 30 which monitors the data stream arriving at the CE 2 for the presence of predefined information elements. The information element recognition part 30 may also be connected to the storage means 25 for comparing received data with the stored set of predefined information elements for recognizing them.

When predefined information elements are recognized by the information element recognition part 30 in the data stream, these information elements are to be passed to an application portion 28 which is provided in the processing means for providing the video application, for example. For passing the information elements (or data corresponding thereto) from the bearer portion 29 to the application portion 28, a message interface 27 is provided therebetween. By means of this message interface 27, the predefined information elements can be passed from the bearer level to the application level in the CE 2 so that the application protocol settings for the VT call can be adjusted locally on the basis of information received directly from the bearer signaling.

There are conceivable also other ways to speed up the video call setup than that described above. For example, it is conceivable to use the BCIE and LCIE parameters mentioned above for transmitting setting information for the application protocol. For example, it is possible to describe all the needed application protocol information in sub-fields of those parameters. However, it is to be noted that these BCIE and LCIE parameters are not always carried over the link between two MSCs. For example if the transit network consists of analogue parts, this bearer capability information is lost. This is indicated in FIG. 3 by means of "if available" in connection with steps S14 and S19. Thus, a mechanism relying solely on the BCIE parameter information would not always work. Additionally, the contents of BCIE and LCIE parameters need to be carefully standardized. Thus, any change in those parameters would require update to both mobile stations and network elements which causes a great amount of work and costs.

As indicated above, according to the present embodiment, it is possible to improve call set-up times, in particular of multimedia call such as Video Telephony calls. Basically, when e.g. a VT call is to be established, a protocol software or the like sends stuffing data to peer entity before application protocols are active. By using special information within the stuffing data, the peer entity is able to detect immediately that the remote end is, for example, a certain kind of VT terminal. This information is then passed to application protocol, which can tune the protocol parameters straight away correctly. In other words, a phase in the call setup procedure which is conventionally some sort of "idle time" it used to transfer the application protocol parameters. Hence, it is possible to bypass the conventional phase of application protocol negotiation by passing the peer entity parameters immediately after a bearer setup over the just created transparent bit pipe. It means that the bearer setup is done in normal way, and when the bit pipe is created the peer entity is informed about the desired application protocol features, i.e. the local video protocol settings. That information is then passed to application protocol stack to speed up the initialization procedure and making it possible to by-pass the application protocol handshaking. Thus, the application level negotiation can be executed locally in the respective communication equipment itself without requiring an additional application handshaking procedure. It is to be note that in most of the cases the video protocol parameters of MO and MT terminals are close to each other and thus by knowing the peer end settings in the earliest possible state it is possible to by-pass that standard and time consuming handshaking procedure.

The present invention is easily to implement since the proposed method has no impacts to existing functionality. For example, in case one of the CE is not able to detect the presence of the predefined information elements or does not apply the proposed mechanism, the VT call setup may proceeds in the conventional manner by means of the normal application protocol handshaking procedure, for example.

Furthermore, by using the mechanism according to the embodiment described above, unlike in a procedure using BCIE and LCIE parameters, for example, the negotiation of application protocol settings can always be done. Since in this described method the negotiation is done once the bearer bit pipe exists it always works.

This procedure does also not create any kind of interoperability (IOP) problems since it can be used regardless of the peer entity. In case the peer end is not aware of this method it interprets the incoming frames as garbage. In case the BCIE information would be used, for example, both the BCIE parameter and video application protocol negotiations needs to be well agreed and IOP tested before they can be used, but there may be still problems with older mobile/network versions. However the mechanism described in the embodiment does not involve such problems.

Even though the above described embodiment is directed to the connection of two communication equipments, it is to be understood that the present invention is also applicable to cases where more than two communication equipments are involved in the multimedia call. In such a case, the described steps are to be performed between each of the involved communication equipments or one communication equipment may be set as a central server which performs the steps according to the present invention with the other communication equipments sequentially or in parallel.

As described above, a method of controlling an establishment of a multimedia call between at least two communication equipments, a corresponding system, and a corresponding communication equipment comprise a set up of a bearer connection resulting in a creation of a data transmission channel between at least two communication equipments.

A data stream is transmitted between the at least two communication equipments after the creation of the data transmission channel for maintaining synchronization of the data transmission channel. Predefined information elements are introduced in the data stream, wherein the predefined information elements indicates local protocol settings for the multimedia call. The predefined information elements are recognized from the data stream, and parameters of an application protocol used for the multimedia call are adjusted on the basis of the predefined information elements.

It should be understood that the above description and accompanying figures are merely intended to illustrate the present invention by way of example only. The preferred embodiments of the present invention may thus vary within the scope of the attached claims.

The invention claimed is:
1. A method comprising:
    causing set up of a bearer connection resulting in a creation of a data transmission channel with at least one other communication equipment;
    causing transmission and receipt of a continuous data stream with the at least one other communication equipment after the creation of the data transmission channel for maintaining synchronization of the data transmission channel;
    detecting, subsequent to receipt of the continuous data stream from the at least one other communication equipment, an application protocol configuration;
    causing transmission of a corresponding indication to the at least one other communication equipment, the corresponding indication comprising a pre-agreed string of payload characters and being transmitted a pre-agreed number of times;
    causing predefined information elements to be introduced in the data stream, wherein the predefined information elements indicate local protocol settings for a multimedia call and include at least one indication meant for at least one application;
    recognizing predefined information elements from the data stream received from the at least one other communication equipment; and
    adjusting parameters of an application protocol used for the multimedia call based on the recognized predefined information elements.
2. The method according to claim 1, further comprising:
    passing setting information received by the predefined information elements recognized in the data stream to an application portion in a communication equipment for executing the step of adjusting the parameters of the application protocol.

3. The method according to claim 2, wherein passing setting information received by the predefined information elements to the application portion is executed by a message interface between a local bearer portion and the application portion.

4. The method according to claim 1, further comprising:
causing transmission of the data stream including the predefined information elements to be repeated for a predetermined number of times.

5. The method according to claim 1, further comprising:
initializing an application protocol handshaking procedure in parallel with or after causing the predefined information elements to be introduced in the data stream transmitted with the at least one other communication equipment.

6. The method according to claim 5, wherein initializing the application protocol handshaking procedure is executed when the predefined information elements are not recognized in the data stream after a predetermined time is elapsed.

7. The method according to claim 5, wherein, when the predefined information elements are recognized in the data stream after the application protocol handshaking procedure has been initialized, the method further comprising:
interrupting the application protocol handshaking procedure, and
using the predefined information elements recognized in the data stream as a basis for adjusting the parameters of the application protocol.

8. The method according to claim 1, further comprising:
formatting the predefined information elements into a format that is suitable for performing an error detection processing on transmitted predefined information elements.

9. The method according to claim 1, wherein the predefined information elements comprises information that can be used by a receiving side communication equipment for determining a kind of a sending side communication equipment.

10. The method according to claim 1, wherein the creation of the data transmission channel with the at least one other communication equipment is a creation of a synchronous transparent bit pipe with the at least one other communication equipment.

11. The method according to claim 1, wherein the establishment of the multimedia call comprises an establishment of a circuit switched communication connection.

12. The method according to claim 1, wherein the establishment of the multimedia call comprises an establishment of a video telephony call.

13. A system comprising:
at least two communication equipments; and
a communication network for transmitting data between the at least two communication equipments,
wherein the system is configured to:
set up a bearer connection resulting in a creation of a data transmission channel between the at least two communication equipments;
cause transmission or reception of a continuous data stream between the at least two communication equipments after the creation of the data transmission channel for maintaining synchronization of the data transmission channel;
detect, subsequent to receipt of the continuous data stream from the at least one other communication equipment, an application protocol configuration;
cause transmission of a corresponding indication to the at least one other communication equipment, the corresponding indication comprising a pre-agreed string of payload characters and being transmitted a pre-agreed number of times;
introduce predefined information elements in the data stream, wherein the predefined information elements indicate local protocol settings for a multimedia call and include at least one indication meant for at least one application, receive the data stream and recognize the predefined information elements from the data stream; and
adjust parameters of an application protocol used for the multimedia call based on the predefined information elements.

14. A system comprising:
at least two communication equipments; and
a communication network for transmitting data between the at least two communication equipments
wherein the system further comprises means for processing including a local bearer portion for setting up a bearer connection resulting in a creation of a data transmission channel between at least two communication equipments;
means for causing transmission or reception of a continuous data stream between the at least two communication equipments after the creation of the data transmission channel for maintaining synchronization of the data transmission channel;
wherein the means for processing further comprises:
means for detecting, subsequent to receipt of the continuous data stream from the at least one other communication equipment, an application protocol configuration;
means for causing transmission of a corresponding indication to the at least one other communication equipment, the corresponding indication comprising a pre-agreed string of payload characters and being transmitted a pre-agreed number of times;
means for introducing predefined information elements in the data stream, wherein the predefined information elements indicate local protocol settings for a multimedia call and include at least one indication meant for at least one application;
means for receiving the data stream;
means for recognizing the predefined information elements from the data stream; and
an application portion for adjusting parameters of an application protocol used for the multimedia call based on the predefined information elements.

15. The system according to claim 14, wherein the means for processing further comprises
means for passing setting information received by the predefined information elements recognized in the data stream to the application portion for adjusting parameters of the application protocol.

16. The system according to claim 15, further comprising a message interface for passing the predefined information elements to the application portion from the local bearer portion and the multimedia application portion in the communication equipment.

17. The system according to claim 14, wherein the means for processing further comprises means for repeating a transmission of the data stream including the predefined information elements for a predetermined number of times.

18. The system according to claim 14, wherein the means for processing further comprises means for controlling the application portion to initialize an application protocol handshaking procedure in parallel with or after introducing the predefined information elements in the data stream transmitted between the communication equipments.

19. The system according to claim 18, wherein the means for controlling controls the application portion to initialize the application protocol handshaking procedure when the predefined information elements are not recognized in the data stream after a predetermined time is elapsed.

20. The system according to claim 18, wherein, when the predefined information elements are recognized in the data stream after the application protocol handshaking procedure has been initialized, the means for processing further comprises
means for interrupting the application protocol handshaking procedure of the application portion, and
means for instructing a usage of the predefined information elements recognized in the data stream for adjusting the parameters of the application protocol.

21. The system according to claim 14, wherein the means for processing further comprises means for formatting the predefined information elements into a format suitable for performing an error detection processing on transmitted predefined information elements.

22. The system according claim 14, wherein the predefined information elements comprise information which can be used by a receiving side communication equipment for determining a kind of a sending side communication equipment.

23. The system according to claim 14, wherein the creation of a data transmission channel between at least two communication equipments is a creation of a synchronous transparent bit pipe between the at least two communication equipments.

24. The system according to claim 14, wherein the establishment of the multimedia call comprises an establishment of a circuit switched communication connection.

25. The system according to claim 14, wherein the establishment of the multimedia call comprises an establishment of a video telephony call.

26. An apparatus comprising at least one processor and at least one memory storing computer program code, wherein the at least one memory and stored computer program code are configured, with the at least one processor, to cause the apparatus to at least:
cause set up of a bearer connection resulting in a creation of a data transmission channel to at least one other communication equipment;
cause transmission and receipt of a continuous data stream with the at least one other communication equipment after the creation of the data transmission channel for maintaining synchronization of the data transmission channel;
cause detection, subsequent to receipt of the continuous data stream from the at least one other communication equipment, an application protocol configuration;
cause transmission of a corresponding indication to the at least one other communication equipment, the corresponding indication comprising a pre-agreed string of payload characters and being transmitted a pre-agreed number of times;
cause predefined information elements to be introduced in the data stream transmitted to the at least one other communication equipment, wherein the predefined information elements indicate local protocol settings for a multimedia call and include at least one indication meant for at least one application;
recognize predefined information elements from the data stream received from the at least one other communication equipment; and
adjust parameters of an application protocol used for the multimedia call based on the predefined information elements received.

27. The apparatus according to claim 26, wherein the at least one memory and stored computer program code are configured, with the at least one processor, to further cause the apparatus to
pass setting information received by the predefined information elements recognized in the data stream received from the at least one other communication equipment to an application portion configured to adjust the parameters of the application protocol.

28. The apparatus according to claim 27, wherein the at least one memory and stored computer program code are configured, with the at least one processor, to further cause the apparatus to pass the predefined information elements received from the at least one other communication equipment to the application portion by using a message interface between a local bearer portion and the application portion.

29. The apparatus according to claim 26, wherein the at least one memory and stored computer program code are configured, with the at least one processor, to further cause the apparatus to cause transmission of the data stream including the predefined information elements to be repeated for a predetermined number of times.

30. The apparatus according to claim 26, wherein the at least one memory and stored computer program code are configured, with the at least one processor, to further cause the apparatus to initialize an application protocol handshaking procedure in parallel with or after causing the predefined information elements to be introduced in the data stream transmitted to the at least one other communication equipment.

31. The apparatus according to claim 30, wherein the at least one memory and stored computer program code are configured, with the at least one processor, to cause the apparatus to initialize the application protocol handshaking procedure when the predefined information elements are not recognized in the data stream received from the at least one other communication equipment after a predetermined time is elapsed.

32. The apparatus according to claim 30, wherein, when the predefined information elements are recognized in the data stream from the at least one other communication equipment after the application protocol handshaking procedure has been initialized, the at least one memory and stored computer program code are configured, with the at least one processor, to further cause the apparatus to
interrupt the application protocol handshaking procedure, and
use the predefined information elements recognized in the data stream from the at least one other communication equipment for adjusting the parameters of the application protocol.

33. The apparatus according to claim 26, wherein the at least one memory and stored computer program code are configured, with the at least one processor, to further cause the apparatus to format the predefined information elements into a format suitable for performing an error detection processing on transmitted predefined information elements.

34. The apparatus according to claim 26, wherein the predefined information elements comprise information that can be used by a receiving side communication equipment for determining a kind of a sending side communication equipment.

35. The apparatus according to claim 26, wherein the creation of a data transmission channel to the at least one other communication equipment comprises a creation of a synchronous transparent bit pipe between the apparatus and the at least one other communication equipment.

36. The apparatus according to claim 26, wherein the establishment of the multimedia call comprises an establishment of a circuit switched communication connection.

37. The apparatus according to claim 26, wherein the establishment of the multimedia call comprises an establishment of a video telephony call.

38. An apparatus comprising:
 means for processing including a local bearer portion for causing set up of a bearer connection resulting in a creation of a data transmission channel with at least one other communication equipment; and
 means for causing transmission and receipt of a continuous data stream with the at least one other communication equipment after the creation of the data transmission channel for maintaining synchronization of the data transmission channel,
 wherein the means for processing further comprises:
 means for detecting, subsequent to receipt of the continuous data stream from the at least one other communication equipment, an application protocol configuration;
 means for causing transmission of a corresponding indication to the at least one other communication equipment, the corresponding indication comprising a pre-agreed string of payload characters and being transmitted a pre-agreed number of times;
 means for causing predefined information elements to be introduced in the data stream transmitted to the at least one other communication equipment, wherein the predefined information elements indicate local protocol settings for a multimedia call and include at least one indication meant for at least one application;
 means for recognizing predefined information elements from the data stream received from the at least one other communication equipment; and
 an application portion for adjusting parameters of an application protocol used for the multimedia call based on the predefined information elements received from the at least one other communication equipment.

39. The apparatus according to claim 38, wherein the means for processing further comprises
 means for passing setting information received by the predefined information elements recognized in the data stream received from the at least one other communication equipment to the application portion for adjusting parameters of the application protocol.

40. The apparatus according to claim 39, further comprising a message interface for passing the predefined information elements received from the at least one other communication equipment to the application portion from the local bearer portion and the multimedia application portion.

41. The apparatus according to claim 38, wherein the means for processing means further comprises means for causing transmission of the data stream to the at least one other communication equipment including the predefined information elements to be repeated for a predetermined number of times.

42. The apparatus according to claim 38, wherein the means for processing further comprises means for controlling the application portion to initialize an application protocol handshaking procedure in parallel with or after introducing the predefined information elements in the data stream transmitted to the at least one other communication equipment.

43. The apparatus according to claim 42, wherein the means for controlling controls the application portion to initialize the application protocol handshaking procedure when the predefined information elements are not recognized in the data stream received from the at least one other communication equipment after a predetermined time is elapsed.

44. The apparatus according to claim 42, wherein, when the predefined information elements are recognized in the data stream received from the at least one other communication equipment after the application protocol handshaking procedure has been initialized, the means for processing further comprises
 means for interrupting the application protocol handshaking procedure of the application portion, and
 means for instructing a usage of the predefined information elements recognized in the data stream received from the at least one other communication equipment for adjusting the parameters of the application protocol.

45. The apparatus according to claim 38, wherein the means for processing further comprises means for formatting the predefined information elements into a format suitable for performing an error detection processing on transmitted predefined information elements.

46. The apparatus according to claim 38, wherein the predefined information elements comprise information that can be used by a receiving side communication equipment for determining a kind of a sending side communication equipment.

47. The apparatus according to claim 38, wherein the creation of a data transmission channel comprises a creation of a synchronous transparent bit pipe between the apparatus and the at least one other communication equipment.

48. The apparatus according to claim 38, wherein the establishment of the multimedia call comprises an establishment of a circuit switched communication connection.

49. The apparatus according to claim 38, wherein the establishment of the multimedia call comprises an establishment of a video telephony call.

50. An apparatus comprising at least one processor and at least one memory storing computer program code, wherein the at least one memory and stored computer program code are configured, with the at least one processor, to cause the apparatus to at least:
 cause set up of a bearer connection resulting in a creation of a data transmission channel with at least one other communication equipment;
 cause transmission of a continuous data stream to the at least one other communication equipment after the creation of the data transmission channel for maintaining synchronization of the data transmission channel;
 cause detection, subsequent to receipt of a continuous data stream from the at least one other communication equipment, an application protocol configuration;
 cause transmission of a corresponding indication to the at least one other communication equipment, the corresponding indication comprising a pre-agreed string of payload characters and being transmitted a pre-agreed number of times; and
 cause predefined information elements to be introduced in the data stream transmitted to the at least one other communication equipment, wherein the predefined information elements indicate local protocol settings for a multimedia call and include at least one indication meant for at least one application.

51. An apparatus comprising at least one processor and at least one memory storing computer program code, wherein the at least one memory and stored computer program code are configured, with the at least one processor, to cause the apparatus to at least:
  cause set up of a bearer connection resulting in a creation of a data transmission channel with at least one other communication equipment;
  receive a continuous data stream from the at least one other communication equipment after the creation of the data transmission channel for maintaining synchronization of the data transmission channel;
  detect, subsequent to receipt of the continuous data stream from the at least one other communication equipment, an application protocol configuration;
  cause transmission of a corresponding indication to the at least one other communication equipment, the corresponding indication comprising a pre-agreed string of payload characters and being transmitted a pre-agreed number of times;
  recognize predefined information elements from the data stream received from the at least one other communication equipment, the predefined information elements indicating local protocol settings of the at least one other communication equipment for a multimedia call and include at least one indication meant for at least one application; and
  adjust parameters of an application protocol used for the multimedia call based on the predefined information elements received.

52. A processing device configured to
  control a set up of a bearer connection resulting in a creation of a data transmission channel with the at least one other communication equipment;
  control a transmission and receipt of a continuous data stream with the at least one other communication equipment after the creation of the data transmission channel for maintaining synchronization of the data transmission channel;
  control detection, subsequent to receipt of the continuous data stream from the at least one other communication equipment, an application protocol configuration;
  control a transmission of a corresponding indication to the at least one other communication equipment, the corresponding indication comprising a pre-agreed string of payload characters and being transmitted a pre-agreed number of times;
  control an introduction of predefined information elements in the data stream transmitted to the at least one other communication equipment, wherein the predefined information elements indicate local protocol settings for a multimedia call and include at least one indication meant for at least one application;
  control recognizing of predefined information elements from the data stream received from the at least one other communication equipment; and
  control an adjustment of parameters of an application protocol used for the multimedia call based on the predefined information elements received.

53. A computer program product comprising at least one tangible, non-transitory computer readable storage medium having computer-readable program instructions stored therein, the computer-readable program instructions comprising:
  program instructions configured to cause set up of a bearer connection resulting in a creation of a data transmission channel with at least one other communication equipment;
  program instructions configured to cause transmission and receipt of a continuous data stream with the at least one other communication equipment after the creation of the data transmission channel for maintaining synchronization of the data transmission channel;
  program instructions configured to cause detection, subsequent to receipt of the continuous data stream from the at least one other communication equipment, an application protocol configuration;
  program instructions configured to cause transmission of a corresponding indication to the at least one other communication equipment, the corresponding indication comprising a pre-agreed string of payload characters and being transmitted a pre-agreed number of times;
  program instructions configured to cause predefined information elements to be introduced in the data stream transmitted to the at least one other communication equipment, wherein the predefined information elements indicate local protocol settings for a multimedia call and include at least one indication meant for at least one application;
  program instructions configured to recognize predefined information elements from the data stream received from the at least one other communication equipment; and
  program instructions configured to adjust parameters of an application protocol used for the multimedia call based on the predefined information elements received.

54. A chipset configured to
  cause set up of a bearer connection resulting in a creation of a data transmission channel with at least one other communication equipment;
  control a transmission and a receipt of a continuous data stream with the at least one other communication equipment after the creation of the data transmission channel for maintaining synchronization of the data transmission channel;
  detect, subsequent to receipt of the continuous data stream from the at least one other communication equipment, an application protocol configuration;
  cause transmission of a corresponding indication to the at least one other communication equipment, the corresponding indication comprising a pre-agreed string of payload characters and being transmitted a pre-agreed number of times;
  cause predefined information elements to be introduced in the data stream transmitted to the at least one other communication equipment, wherein the predefined information elements indicate local protocol settings for a multimedia call and include at least one indication meant for at least one application;
  recognize predefined information elements from the data stream received from the at least one other communication equipment; and
  adjust parameters of an application protocol used for the multimedia call based on the predefined information elements received.

55. The apparatus according to claim 50, wherein the at least one memory and stored computer program code are configured, with the at least one processor, to cause the apparatus to cause transmission of the data stream including the predefined information elements to be repeated for a predefined number of times.

56. The apparatus according to claim 50, wherein the at least one memory and stored computer program code are configured, with the at least one processor, to further cause the apparatus to initialize an application protocol handshaking procedure in parallel with or after causing the predefined information elements to be introduced in the data stream.

57. The apparatus according to claim 51, wherein the at least one memory and stored computer program code are configured, with the at least one processor, to further cause the apparatus to pass setting information received by the predefined information elements recognized in the data stream to an application portion for execution of adjusting the parameters of the application protocol.

58. The processing device according to claim 52, wherein the processing device is further configured to control a passing of setting information received by the predefined information elements recognized in the data stream to an application portion for controlling execution of adjustment of the parameters of the application protocol.

59. The processing device according to claim 52, wherein the processing device is further configured to initialize an application protocol handshaking procedure in parallel with or after introduction of the predefined information elements in the data stream.

60. The chipset according to claim 54, wherein the chipset is further configured to control a passing of setting information received by the predefined information elements recognized in the data stream to an application portion for controlling execution of adjustment of the parameters of the application protocol.

61. The chipset according to claim 54, wherein the chipset is further configured to control initialization of an application protocol handshaking procedure in parallel with or after introduction of the predefined information elements in the data stream.

* * * * *